(12) United States Patent
Arnell

(10) Patent No.: US 12,728,384 B2
(45) Date of Patent: Sep. 8, 2026

(54) GAS SORPTION SYSTEM

(71) Applicant: MUNTERS EUROPE AKTIEBOLAG, Kista (SE)

(72) Inventor: Robert Arnell, Örsundsbro (SE)

(73) Assignee: Munters Europe Aktiebolag, Kista (SE)

( * ) Notice: Subject to any disclaimer, the term of this patent is extended or adjusted under 35 U.S.C. 154(b) by 314 days.

(21) Appl. No.: 18/684,562

(22) PCT Filed: Jun. 23, 2022

(86) PCT No.: PCT/EP2022/067264

§ 371 (c)(1),
(2) Date: Feb. 16, 2024

(87) PCT Pub. No.: WO2023/025435

PCT Pub. Date: Mar. 2, 2023

(65) Prior Publication Data

US 2024/0350963 A1 Oct. 24, 2024

(30) Foreign Application Priority Data

Aug. 23, 2021 (SE) .................................... 2151014-4

(51) Int. Cl.
*B01D 53/06* (2006.01)
*B01D 53/26* (2006.01)

(52) U.S. Cl.
CPC ........... *B01D 53/06* (2013.01); *B01D 53/265* (2013.01); *B01D 2257/304* (2013.01); (Continued)

(58) Field of Classification Search
CPC ...................................................... B01D 53/06
See application file for complete search history.

(56) References Cited

U.S. PATENT DOCUMENTS 4,926,618 A 5/1990 Ratliff
7,428,821 B2 9/2008 Kashirajima et al.
(Continued)

FOREIGN PATENT DOCUMENTS

CN 112984649 A 6/2021
JP 06-343819 A 12/1994
(Continued)

OTHER PUBLICATIONS

English Translation of Document Identification No. JP 2012061398 provided by the United States Patent and Trademark Office Software Tool PE2E Search: Nagata Yuji; Adsorption/Desorption Type Concentration Device; Mar. 29, 2012 (Year: 2012).*
(Continued)

*Primary Examiner* — Kevin Joyner
(74) *Attorney, Agent, or Firm* — Medler Ferro Woodhouse & Mills PLLC

(57) ABSTRACT

A gas sorption system for removal of moisture, carbon dioxide, ammonia, hydrogen sulfide, volatile organic compounds or mixtures thereof from air includes a main sorption unit; a main process air circuit arranged to conduct a main process airflow through a main sorption rotor in the main sorption unit; a main regeneration air circuit arranged to conduct a main regeneration airflow through the main sorption rotor in the main sorption unit; and a purge air circuit arranged to conduct a purge airflow through the main sorption rotor in the main sorption unit, the purge airflow being configured to flow through the main sorption rotor in the same direction as the main regeneration airflow. A pre-processing unit is connected to the main regeneration air circuit upstream of the main sorption unit and is arranged to heat and/or to dehumidify the main regeneration airflow upstream of the main sorption unit.

11 Claims, 8 Drawing Sheets

(52) U.S. Cl.
CPC .. *B01D 2257/406* (2013.01); *B01D 2257/504* (2013.01); *B01D 2257/708* (2013.01); *B01D 2257/80* (2013.01); *B01D 2259/4009* (2013.01)

(56) References Cited

U.S. PATENT DOCUMENTS

| | | | | |
|---|---|---|---|---|
| 2005/0050906 | A1 | 3/2005 | Dinnage et al. | |
| 2007/0056307 | A1 | 3/2007 | Caggiano | |
| 2010/0275775 | A1 | 11/2010 | Griffiths et al. | |
| 2018/0154303 | A1 | 6/2018 | Giles et al. | |
| 2021/0394116 | A1* | 12/2021 | Mast .................... | B01D 53/002 |

FOREIGN PATENT DOCUMENTS

| | | | |
|---|---|---|---|
| JP | 10-85546 | A | 4/1998 |
| JP | 11-188224 | A | 7/1999 |
| JP | 2010-247040 | A | 11/2010 |
| JP | 2012-061389 | A | 3/2012 |
| JP | 4990443 | B2 | 5/2012 |
| JP | 2016-084982 | A | 5/2016 |
| JP | 2016-209863 | A | 12/2016 |
| JP | 2017-044387 | A | 3/2017 |
| KR | 10-2016-0102084 | A | 8/2016 |
| WO | 2007/080979 | A1 | 7/2007 |
| WO | 2019-117732 | A1 | 6/2019 |

OTHER PUBLICATIONS

Office Action and Search Report dated Apr. 29, 2022, in Swedish Patent Application No. 2151014-4.

International Search Report dated Sep. 30, 2022, in International Patent Application No. PCT/EP2022/067264.

English translation of Office Action dated Jan. 27, 2025, in Japanese Patent Application No. 2023-579500.

* cited by examiner

GAS SORPTION SYSTEM

TECHNICAL FIELD

The present disclosure relates to a gas sorption system, and a method of controlling the gas sorption system. Gases targeted for removal from the air could be moisture, carbon dioxide, ammonia, hydrogen sulphide, and volatile organic compounds. The present disclosure also relates to a computer program and computer-readable medium.

BACKGROUND ART

Dehumidifiers, such as sorption dehumidifiers and condensate dehumidifiers, are used for separating and removing moisture from air. A sorption dehumidifier typically comprises a dehumidifying element in the form of a wheel or rotor holding desiccant material, which is effective in attracting and retaining water vapour. The dehumidifier may comprise two sections for the desiccant rotor, a process section and a regeneration section. The airflow to be dehumidified, process air, will pass through the process section and pass through the desiccant rotor. The desiccant material in the rotor extracts moisture from the process air, so that it can leave the rotor as dried air. Simultaneously, the desiccant material is regenerated by another air stream, which flows through the regeneration section, all the while the desiccant rotor may rotate slowly about its longitudinal axis. By means of the simultaneous dehumidification of the process air and regeneration of desiccant material, the dehumidifier can be operated continuously. US2007056307 discloses an example of a dehumidifier having a desiccant wheel.

For the regeneration process to be effective, the air stream used for regeneration of the desiccant material in the rotor needs to have a relatively high temperature, and will typically need to be heated. It may be advantageous to cool the process air prior to the dehumidifier inlet, in order to remove moisture due to cooling. The heat subtracted from the process airflow during cooling can be transferred to the regeneration air stream by the provision of a heat pump in the dehumidification system. US2005/0050906A1 shows an example of this, where process air is cooled by the evaporator of a heat pump prior to the dehumidifier inlet, and the regeneration air is heated by the condenser of the heat pump.

There is an ongoing interest in minimising the energy consumption of the dehumidification process, for economic reasons and for consideration of climate aspects, and in obtaining stable operation of the dehumidification unit.

An even more effective regeneration process may be achieved if an additional air stream, a purge air stream, is used for regeneration of the desiccant material in the rotor. Further, a low dew point of the process air delivered from a sorption dehumidifier may be provided if two desiccant rotors are arranged in series. The document JP4990443 B2 discloses a two-stage dehumidifying device constituted with a first rotor and the second rotor. Each rotor is provided with passages for process air, regeneration air and purge air. The process air passage downstream of the first rotor is connected to the process air passage upstream of the second rotor.

The working principle for sorption systems targeting other gases than moisture is similar to the working principle for dehumidification systems, except that different sorbents are used in the wheel or rotor. Therefore, replacing the desiccant rotor in a dehumidification system to a sorption rotor for removing carbon dioxide, ammonia, hydrogen sulphide and volatile organic compounds (VOC) is applicable. Systems for manufacturing or other industrial processes often exhaust, as byproducts, particulates and fumes or exhaust vapors that may include gaseous air pollutants such as volatile organic compounds. It is desirable for environmental and health reasons, and to comply with environmental laws, to remove the VOCs before exhausting the fumes to atmosphere. VOC reduction apparatuses, provided with a rotor element that holds a medium for removal of the VOCs, are used for abatement of VOCs in industrial process gases. Certain known VOC abatement systems utilize a rotor element that holds a medium for removal of the VOCs. One example of such a medium is zeolite. Zeolite is an inorganic crystal with properties suited to adsorbing VOCs. As the rotor element rotates at a controlled speed, VOC-laden process airflow is directed through a defined adsorption zone of the apparatus and leaves as substantially clean air as the zeolite adsorbs and removes a majority of the VOCs from the process airflow. The cleaned air can then be safely discharged to atmosphere. The rotor element continues to rotate and zeolite sections of the rotor element that had adsorbed VOCs are moved to a defined desorption or regeneration zone. In order to remove the VOCs adsorbed by the rotor element, heated regeneration air is directed through the rotor element in the regeneration zone of the VOC reduction apparatus. The removed VOCs are carried in a concentrate airstream away from the rotor for further processing. Thus, the rotor element turns continuously, so that the adsorbed VOCs are moved from the adsorption zone to the regeneration zone where the VOCs are removed from the rotor element, and the regenerated sector of the rotor then returns to the adsorption zone where the process air stream flows in a continuous process through the rotor element. The concentrate airstream of VOCs can be sent to an oxidizer and/or catalyst where the VOCs are converted to residual products, such as water vapor and carbon dioxide (CO2). Such a zeolite rotor element can be incorporated in more complex systems that includes one or more rotor elements and corresponding drive motors as well as various motor-driven fans. The document US2018154303A1 discloses an apparatus for removing specified substances from a process gaseous stream, which apparatus comprises rotor elements.

SUMMARY OF THE INVENTION

The dehumidifying capacity of a dehumidifier can generally be changed by reducing or increasing the process air stream and/or increasing the regeneration energy. Further, separate sectors for the desiccant rotor are able to increasing the dehumidifying capacity, achieving very low dew points, resulting in dry process air, and saving heating energy by heat recovery and changes of the temperature of the rotor material. In addition to a process and a regenerative sector also a purge air sector may be arranged for the desiccant rotor. By means of the purge air sector, low dry air dew points, reduction of heater energy of the regeneration air stream, and reduced cooling energy of the process air temperature downstream of the desiccant rotor are achieved. Since the working principle for sorption systems targeting other gases than moisture is similar to the working principle for dehumidification systems, when different sorbents are used in the wheel or rotor, everything in the text referring to dehumidification is applicable also to carbon dioxide, ammonia, hydrogen sulphide and volatile organic compounds sorption and removal.

Despite known solutions in the field, it would be desirable to develop a gas sorption system, and a method of controlling the gas sorption system, which overcomes or alleviates at least some of the drawbacks of the prior art.

An objective of the present invention is to achieve a gas sorption system, and a method of controlling the gas sorption system, which allows for a low dew point and thus dry air.

A further objective of the present invention is to achieve a gas sorption system, and a method of controlling the gas sorption system, which allows for sorption and removal of carbon dioxide, ammonia, hydrogen sulphide and volatile organic compounds.

A further objective of the present invention is to achieve a gas sorption system, and a method of controlling the gas sorption system, which allows for energy efficiency.

A further objective of the present invention is to achieve a gas sorption system, and a method of controlling the gas sorption system, which allows for a stable, reliable and effective treatment of air, and thereby improves the functionality/performance of the gas sorption system.

These objectives are achieved with the above-mentioned gas sorption system, and method of controlling the gas sorption system according to the appended claims. These objectives are also achieved with the above-mentioned computer program and computer-readable medium according to the appended claims.

According to an aspect of the invention, a gas sorption system is provided. The gas sorption system comprising: a main sorption unit; a main process air circuit arranged to conduct a main process airflow through a main sorption rotor in the main sorption unit; a main regeneration air circuit arranged to conduct a main regeneration airflow through the main sorption rotor in the main sorption unit; and a purge air circuit arranged to conduct a purge airflow through the main sorption rotor in the main sorption unit, which purge airflow is configured to flow through the main sorption rotor in the same direction as the main regeneration airflow, characterised in that the gas sorption system further comprises a pre-processing unit connected to the main regeneration air circuit upstream of the main sorption unit, wherein the pre-processing unit is arranged to heat and/or to dehumidify the main regeneration airflow upstream of the main sorption unit.

According to a further aspect of the invention a method, performed by a control device, for controlling a gas sorption system is provided. The gas sorption system comprising: a main sorption unit; a main process air circuit arranged to conduct a main process airflow through a main sorption rotor in the main sorption unit; a main regeneration air circuit arranged to conduct a main regeneration airflow through the main sorption rotor in the main sorption unit; a purge air circuit arranged to conduct a purge airflow through the main sorption rotor in the main sorption unit, which purge airflow is configured to flow through the main sorption rotor in the same direction as the main regeneration airflow and the control device, wherein the gas sorption system further comprises a pre-processing unit connected to the main regeneration air circuit upstream of the main sorption unit, wherein the pre-processing unit is arranged to heat and/or to dehumidify the main regeneration airflow upstream of the main sorption unit, wherein the method comprising the steps of: controlling the main sorption unit depending on the characteristics of the main process air in the main process airflow downstream of the main sorption unit; and controlling the pre-processing unit depending on the characteristics of the main reactivation air in the main reactivation airflow upstream of the main sorption unit.

According to an aspect of the invention, a computer program is provided, the computer program comprising instructions which, when the program is executed by a computer, cause the computer to carry out the method. Also, a computer-readable medium is provided, the computer-readable medium comprising instructions, which when executed by a computer, cause the computer to carry out the method. This has the advantage that the method may be comprised in pre-programmed software, which may be implemented into the control device of the system, suitable for utilizing the method.

An advantage of the invention is that the gas sorption system, and the method of controlling the gas sorption system, allows for a low dew point and thus dry air. The low dew point and especially an ultra-low dew point is reached by regenerating the rotor to a very dry state and then re-cool the rotor in a purge sector for the rotor. The purge sector improves the regeneration efficiency so that the full potential of the sorption rotor can be utilized even for rotors having a large thickness. A further advantage of the present invention is that the gas sorption system, and the method of controlling the gas sorption system, allows for sorption and removal of carbon dioxide, ammonia, hydrogen sulphide and volatile organic compounds. A further advantage of the present invention is that the gas sorption system, and the method of controlling the gas sorption system, allows for energy efficiency. This makes it possible to achieve a low dew point and thus dry air using a rotor having a small diameter and higher linear flow rates, and at the same time achieving an energy reduction due to low temperature demands of the reactivation air stream. A further advantage of the present invention is that the gas sorption system, and the method of controlling the gas sorption system, allows for a stable, reliable and effective treatment of air, and thereby improves the functionality/performance of the gas sorption system.

The removed carbon dioxide, ammonia, hydrogen sulphide and volatile organic compounds, carried in the regenerating airflow, will be concentrated when treated in the gas sorption system. The concentrate of carbon dioxide, ammonia, hydrogen sulphide and volatile organic compounds may be sent to a converter where the carbon dioxide, ammonia, hydrogen sulphide and volatile organic compounds are converted by oxidation to residual products, such as water vapor and $CO_2$ in an oxidation converter or where the carbon dioxide, ammonia, hydrogen sulphide and volatile organic compounds are converted to residual products by other means, such as condensing in a cooling converter or sedimentation in a sedimentation converter.

Additional objectives, advantages and novel features of the invention will be apparent to one skilled in the art from the following details, and through exercising the invention. While the invention is described below, it should be apparent that the invention may not be limited to the specifically described details. One skilled in the art, having access to the teachings herein, will recognize additional applications, modifications and incorporations in other areas, which are within the scope of the invention.

BRIEF DESCRIPTION OF THE DRAWINGS

For fuller understanding of the present disclosure and further objects and advantages of it, the detailed description set out below should be read together with the accompanying drawings, in which the same reference notations denote similar items in the various figures, and in which.

DETAILED DESCRIPTION

Figure 1:
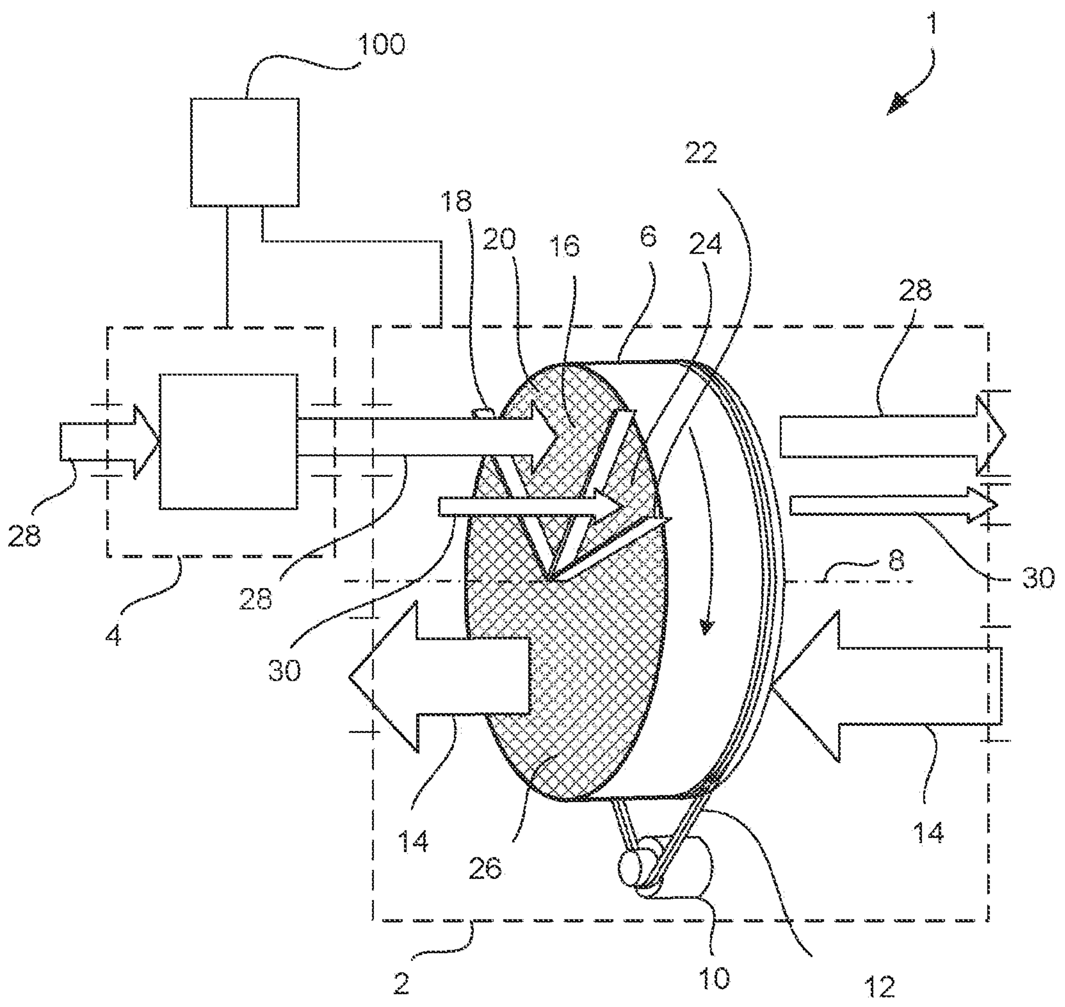
FIG. 1 schematically illustrates a view in perspective of a gas sorption system according to an example.

The detailed description with reference to the examples depicted are to be viewed as examples comprising a combination of certain features, which features have been described in detail above. It is thus to be understood that additional examples may be achieved by combining other features into examples not depicted herein. The figures are to be viewed as examples and not mutually exclusive combinations. It should also be noted that all figures shown and described are schematically represented, wherein generic parts of machinery or similar is not depicted for the sake of simplicity.

According to an aspect of the present disclosure, a gas sorption system is provided. The gas sorption system comprising: a main sorption unit; a main process air circuit arranged to conduct a main process airflow through a main sorption rotor in the main sorption unit; a main regeneration air circuit arranged to conduct a main regeneration airflow through the main sorption rotor in the main sorption unit; and a purge air circuit arranged to conduct a purge airflow through the main sorption rotor in the main sorption unit, which purge airflow is configured to flow through the main sorption rotor in the same direction as the main regeneration airflow, characterised in that the gas sorption system further comprises a pre-processing unit connected to the main regeneration air circuit upstream of the main sorption unit, wherein the pre-processing unit is arranged to heat and/or to dehumidify the main regeneration airflow upstream of the main sorption unit.

For dehumidification, the gas sorption system is configured to treat air in order to separate and remove moisture, such as water vapour from the air. Very dry air or ultra-dry air may be achieved if all or most of the moisture is removed from the air. Such dry air may be conveyed to a dry space or a dry room in which activities, such as manufacturing processes are performed having large demands on dry air in the surrounding space. The gas sorption system may also be configured to treat and remove carbon dioxide, ammonia, hydrogen sulphide, and volatile organic compounds, and also a mixture of these substances from air.

The main sorption unit may comprise a main desiccant rotor for dehumidification. The main desiccant rotor holding desiccant material, which is effective in attracting and retaining water vapour. The main process airflow will flow in the main process air circuit and pass through the main desiccant rotor. Desiccant material in the main desiccant rotor extracts moisture from the main process air in the main process airflow, so that the main process air can leave the main desiccant rotor as dried air. The extracted moisture from the main process air is removed from the desiccant material in the main desiccant rotor by the main regeneration airflow, which flows in the main regeneration air circuit and through the main desiccant rotor. The removed moisture from the desiccant material is conveyed from the main desiccant rotor by the main regeneration airflow in the main regeneration air circuit downstream of the main desiccant rotor.

In addition to the main process airflow and the main regeneration airflow also a purge airflow is configured to pass through the main desiccant rotor. The purge airflow is arranged to flow in a purge air circuit of the main sorption dehumidifier unit. Thus, the main sorption dehumidifier unit comprises three sections for the main desiccant rotor. The three sections are a main process section, a main regeneration section and a purge section. The temperature of the main desiccant rotor will increase when the main regeneration airflow passes through the rotor. In order to effectively trap moisture and water from the main process airflow in the main desiccant rotor, there is an ambition to decrease the temperature of that part of the main desiccant rotor in which the main regeneration airflow passes through the main desiccant rotor. Therefore, the purge airflow is directed through the purge sector. The purge airflow may have a temperature which is lower than the temperature of the main regeneration airflow passing through the main desiccant rotor. Thus, the purge airflow will decrease the temperature of that part or section of the main desiccant rotor in which the main regeneration airflow passes through the main desiccant rotor. The purge airflow is configured so that the purge inlet air is drier than the process inlet air. The purge airflow is configured to flow through the main desiccant rotor in the same direction as the main regeneration airflow. This will result in that any moisture that is still present in the main desiccant rotor will be pushed out from the main desiccant rotor by means of the purge airflow. Thus, the purge airflow will act deeper into the main desiccant rotor than the main regeneration airflow and what is possible with prior art purge configurations.

The pre-processing unit may be arranged to heat the main regeneration airflow upstream of the main sorption dehumidifier unit. Removing the moisture from the desiccant material in the main desiccant rotor is performed by increasing the temperature of the main regeneration airflow that pass through the main desiccant rotor. Thus, the high temperature of the main regeneration airflow heats the desiccant material in the main desiccant rotor. As a result, the moisture will be extracted from the desiccant material and conveyed from the main desiccant rotor by the main regeneration airflow.

The pre-processing unit may be arranged to dehumidify the main regeneration airflow upstream of the main sorption dehumidifier unit. Removing the moisture from the desiccant material in the main desiccant rotor is performed by decreasing the presence of moisture in the main regeneration airflow that pass through the main desiccant rotor. Thus, a low presence of moisture in the main regeneration airflow will extract moisture from the desiccant material and convey the moisture from the main desiccant rotor by the main regeneration airflow.

The pre-processing unit may be arranged to heat and to dehumidify the main regeneration airflow upstream of the main sorption dehumidifier unit. Removing the moisture from the desiccant material in the main desiccant rotor is performed by increasing the temperature of the main regeneration airflow and by decreasing the presence of moisture in the main regeneration airflow that pass through the main desiccant rotor. Thus, the high temperature of the main regeneration airflow and low presence of moisture in the main regeneration airflow will heat and extract moisture from the desiccant material in the main desiccant rotor. As a result, the moisture will be extracted from the desiccant material and conveyed from the main desiccant rotor by the main regeneration airflow.

All components in the gas sorption system may be connected to a control device. The control device may be configured to control the gas sorption system for treatment of air in order to separate and remove gases, such as water vapour from the air.

According to an aspect, the pre-processing unit comprises a heat pump, comprising an evaporator and a condenser, wherein the main regeneration air circuit is connected to the condenser of the heat pump upstream of the main sorption unit.

Heat subtracted from cooling fluid in the heat pump evaporator can be transferred to the inlet regeneration air, via the refrigerant circuit of the heat pump and the condenser.

An electrical heater may be comprised in the main regeneration airflow circuit upstream of the main desiccant rotor, arranged to optionally heat the main inlet regeneration airflow if needed.

According to an aspect, the purge air circuit is connected to the main process air circuit downstream of the main sorption unit, and wherein the purge inlet airflow is configured to be collected from the main process outlet airflow in the main process air circuit.

The main process airflow downstream of the main sorption unit and thus downstream of the main desiccant rotor is very dry. Collecting the purge airflow from the dry main process airflow in the main process air circuit will provide a purge airflow through the main desiccant rotor having a temperature which is lower than the temperature of the main regeneration airflow passing through the main desiccant rotor. Thus, the purge airflow will decrease the temperature of that part or section of the main desiccant rotor in which the main regeneration airflow passes through the main desiccant rotor. Since the purge airflow remains from the dry main process airflow downstream of the main desiccant rotor, the dry purge airflow will extract and push any moisture that is still present in the main desiccant rotor out from the main desiccant rotor.

According to an aspect, the purge air circuit and regeneration air circuit are connected to the main process air circuit downstream of the main sorption unit, and wherein the purge airflow and regeneration airflow are configured to be collected from the main process airflow in the main process air circuit.

The purge airflow downstream of the main sorption unit and thus downstream of the main desiccant rotor is dry and warm. That is because the purge airflow passes through the area of the main desiccant rotor where the warm main regeneration airflow just before has passed through the main desiccant rotor. Thus, the temperature of the dry purge airflow will increase when passing through the main desiccant rotor.

The purge airflow downstream of the main sorption unit will thus be dry and warm and can be used for a main reactivation airflow. This results in that an energy saving because the main reactivation airflow needs less heating in a reactivation airflow heater and no additional dehumidification.

According to an aspect, the purge air circuit downstream of the main sorption dehumidifier unit is connected to the condenser of the heat pump, and wherein the main regeneration airflow is collected from the purge airflow in the purge air circuit.

According to an aspect, the system further comprises an intermediate fluid circuit with a cooling fluid C, arranged to cool the main process air in a first cooler before inlet of the process air into the main sorption unit, said intermediate fluid circuit comprising a fluid pump and a fluid conduit arranged to conduct cooling fluid C through the first cooler and through the evaporator of the heat pump.

Heat subtracted from cooling fluid in the heat pump evaporator can be transferred to the main inlet regeneration airflow, via the refrigerant circuit of the heat pump and the condenser, i.e. heat subtracted from the main process airflow in the first cooler can be utilized for heating the main inlet regeneration airflow, via the intermediate fluid circuit and the refrigerant circuit of the heat pump.

The control device is advantageously arranged to control the flow of cooling liquid in the intermediate fluid circuit so that the heat subtracted from the main inlet process airflow in the first cooler and from the main outlet regeneration airflow in the first cooler substantially corresponds to the heat required to be transferred to the main inlet regeneration airflow in the condenser of the heat pump in order to reach a given temperature at the main regeneration airflow inlet of the main sorption unit, so as to substantially eliminate the need of additional heating by means of the electrical heater.

Various heat pump arrangements are available in the art, and the components thereof, such as the evaporator and condenser, are chosen in accordance with the selected set up for the intermediate fluid circuit. Thus, different constructions of evaporators and condensers may be suitable, and it is also contemplated that multiple units of evaporators and/or condensers may be used, arranged in series or parallel. The same applies to cooler and heaters, where various heat exchanger designs and multiple units can be used as desired.

According to an aspect, the pre-processing unit comprises a pre-sorption unit; a pre-process air circuit arranged to conduct a pre-process airflow through a pre-sorption rotor in the pre-sorption unit; a pre-regeneration air circuit arranged to conduct a regeneration airflow through the pre-sorption rotor in the pre-sorption unit; and wherein the pre-process air circuit is connected to the main regeneration air circuit upstream of the main sorption rotor for conducting the pre-process airflow to the regeneration air circuit.

For dehumidification the pre-sorption unit comprises the pre-rotor. The pre-desiccant rotor holding desiccant material, which is effective in attracting and retaining water vapour. The pre-process airflow will flow in the pre-process air circuit and pass through the pre-desiccant rotor. Desiccant material in the pre-desiccant rotor extracts moisture from pre-process air in the pre-process airflow, so that the pre-process air can leave the pre-desiccant rotor as dried air. The extracted moisture from the pre-process air is removed from the desiccant material in the pre-desiccant rotor by a pre-regeneration airflow, which flows in a pre-regeneration air circuit and through the pre-desiccant rotor. The removed moisture from the desiccant material is conveyed from the pre-desiccant rotor by the pre-regeneration airflow in the pre-regeneration air circuit downstream of the pre-desiccant rotor. The pre-sorption unit provides the main sorption unit with regenerative air. This is possible since the pre-process air circuit is connected to the main regeneration air circuit upstream of the main desiccant rotor. Thus, the pre-process airflow is conveyed to an inlet for the main regenerative airflow of the main sorption unit. An advantage of this configuration is that the dry air required for regeneration is taken from the pre-sorption dehumidifier instead of from the main sorption dehumidifier process outlet air. Therefore more dry air can be generated.

Since the volume flow of the main regenerative airflow is less than the volume flow of the main process airflow through the main desiccant rotor, and the pre-process airflow from the pre-desiccant rotor is conveyed to the main desiccant rotor as main regenerative airflow, the size of the pre-desiccant rotor can be smaller than the main desiccant rotor. An advantage of this configuration is that the overall size of the pre-sorption unit may be smaller than the main sorption unit, and thus the overall size of the pre-sorption unit and the main sorption unit together may be reduced. This may reduce the space needed for installing the gas sorption system.

According to an aspect, the pre-process air circuit is connected to the purge air circuit upstream of the main sorption rotor for conducting the pre-process airflow to the purge air circuit.

In addition to the connection of the pre-process air circuit to the main regeneration air circuit upstream of the main desiccant rotor, the pre-process air circuit may also be connected to the purge air circuit upstream of the main desiccant rotor. Thus the pre-sorption unit provides the main sorption unit with regenerative air and also with purge air. This is possible since the pre-process air circuit is connected to the main regeneration air circuit and also to the purge air circuit upstream of the main desiccant rotor. Thus, the pre-process airflow is conveyed to the inlet for the main regenerative airflow and to an inlet for the purge airflow of the main sorption unit.

According to an aspect, the pre-sorption rotor is arranged to conduct the pre-process airflow to the main regeneration air circuit via the purge air circuit.

The purge air circuit downstream of the main desiccant rotor may be connected to the main regeneration air circuit upstream of the main desiccant rotor. Further, the purge air circuit upstream of the main desiccant rotor may be connected to the pre-process air circuit downstream of the pre-desiccant rotor. As a result of this configuration, the pre-desiccant rotor may be arranged to conduct the pre-process airflow to the main regeneration air circuit via the purge air circuit. This means that the pre-process airflow first passes the main desiccant rotor as purge air and thereafter the purge air passes the main desiccant rotor again, but as main regenerative air.

According to an aspect, the condenser of the heat pump is connected to the pre-process air circuit downstream of the pre-sorption rotor and to the main regeneration air circuit upstream of the main sorption rotor.

Arranging the condenser of the heat pump between the pre-sorption unit and the main sorption unit will increase the temperature of the main regeneration airflow before passing through the main desiccant rotor. Alternatively, the pre-desiccant rotor is arranged to conduct the pre-process airflow to the main regeneration air circuit via the purge air circuit, and the condenser of the heat pump is positioned in the main regeneration air circuit upstream the main rotor.

According to an aspect, the system further comprises an intermediate fluid circuit with a cooling fluid, arranged to cool the process air in a first cooler before inlet of the process air into the main unit, said intermediate fluid circuit comprising a fluid pump and a fluid conduit arranged to conduct cooling fluid C through the first cooler and through the evaporator of the heat pump.

Heat subtracted from cooling fluid in the heat pump evaporator can be transferred to the main inlet regeneration airflow, via the refrigerant circuit of the heat pump and the condenser, i.e. heat subtracted from the main process airflow in the first cooler can be utilized for heating the main inlet regeneration airflow, via the intermediate fluid circuit and the refrigerant circuit of the heat pump. Since the condenser of the heat pump is connected to the pre-process air circuit downstream of the pre-desiccant rotor and to the main regeneration air circuit upstream of the main desiccant rotor, the pre-process air flow, and thus the main inlet regeneration airflow is dry. The dry main inlet regeneration airflow will thus be heated by the condenser of the heat pump before passing through the main desiccant rotor.

According to a further aspect of the present disclosure, a method, performed by a control device, for controlling a gas sorption system is provided. The gas sorption system comprising: a main sorption unit; a main process air circuit arranged to conduct a main process airflow through a main sorption rotor in the main sorption unit; a main regeneration air circuit arranged to conduct a main regeneration airflow through the main sorption rotor in the main sorption unit; a purge air circuit arranged to conduct a purge airflow through the main sorption rotor in the main sorption unit, which purge airflow is configured to flow through the main sorption rotor in the same direction as the main regeneration airflow and the control device, wherein the gas sorption system further comprises a pre-processing unit connected to the main regeneration air circuit upstream of the main sorption unit, wherein the pre-processing unit is arranged to heat and/or to dehumidify the main regeneration airflow upstream of the main sorption unit, wherein the method comprising the steps of: controlling the main sorption unit depending on the characteristics of the main process air in the main process airflow downstream of the main sorption unit; and controlling the pre-processing unit depending on the characteristics of the main reactivation air in the main reactivation airflow upstream of the main sorption unit.

The method step of controlling the main sorption unit depending on the characteristics of the main process air in the main process airflow downstream of the main sorption unit may comprise controlling the flow rate of the main process airflow passing through the main sorption rotor and/or controlling the regeneration energy in the main regeneration airflow and/or in the purge airflow and/or controlling the rotational speed of the main sorption rotor.

The method step of controlling the pre-processing unit depending on the characteristics of the main reactivation air in the main reactivation airflow upstream of the main sorption unit may comprise controlling the regeneration energy in the pre-regeneration airflow and rotational speed of the pre-processing desiccant rotor.

In addition the cooling energy supplied to coolers upstream and downstream rotors can be controlled to set the amount of moisture to be condensed out from the airstreams.

The present disclosure also relates to a computer program comprising instructions which, when the program is executed by a computer, causes the computer to carry out the method disclosed above. The invention further relates to a computer-readable medium comprising instructions, which when executed by a computer causes the computer to carry out the method disclosed above. The method may be comprised in pre-programmed software, which may be implemented into the control device of the system, suitable for utilizing the method. The pre-programmed software may be stored in the control device. Alternatively, or in combination, the software may be stored in a memory or in computer at a distance from the control device.

The gas sorption system relating to a dehumidification system, the method, the computer program and the computer-readable medium will now be described together with the appended drawings.

FIG. 1 schematically illustrates a view in perspective of a gas sorption system 1, which may be a dehumidification system 1 according to an example. The dehumidification system 1 comprises a main sorption unit 2, which may be a main sorption dehumidifier unit 2. The dehumidification system 1 also comprises a pre-processing unit 4. A control device 100 may be connected to the main sorption dehumidifier unit 2 and the pre-processing unit 4. The main sorption dehumidifier unit 2 comprises a main sorption rotor 6, which may be a main desiccant rotor 6, which is configured to rotate about a center axis 8. A motor 10 is arranged to rotate the main desiccant rotor 6 via a transmission 12. A main process airflow 14 will pass a number of channels 16, which are arranged in the main desiccant rotor 6. The channels 16 extend from one side to the other of the main desiccant rotor 6. The channels 16 may be parallel to the center axis 8 of the main desiccant rotor 6. The main process airflow 14 pass the channels 16 in a first direction. The main desiccant rotor 6 is adapted to treat the main process airflow 14 by reducing water in the main process airflow 14 that may pass through the channels 16 of the main desiccant rotor 6. The main desiccant rotor 6 comprises desiccant material, which is configured to extract moisture from the main process air in the main process airflow 14, so that the main process air can leave the main desiccant rotor 6 as dried air.

A first V-shaped, partition member 18 segregates a pie-shaped portion of the main desiccant rotor 6 from the remaining portion thereof to define a main regeneration section 20 of the main desiccant rotor 6. A second V-shaped, partition member 22 segregates a pie-shaped portion of the main desiccant rotor 6 from the remaining portion thereof to define a purge section 24 of the main desiccant rotor 6. The remaining portion of the main desiccant rotor 6 defines a main process section 26.

The main process airflow 14 to be dehumidified is allowed to flow through the channels 16 in the main desiccant rotor 6. A heated main regeneration airflow 28 is, at the same time, allowed to pass in counter flow through the main regeneration section 20 of the main desiccant rotor 6. The regeneration airflow 28 may emanate from the main process airflow 14 downstream of the main desiccant rotor 6.

The main regeneration airflow 28, increases the temperature of the main desiccant rotor 6, so that the desiccant material in the main desiccant rotor 6 is dried and releases its moisture, which is then carried away by the main regeneration airflow 28. The dried desiccant material in the main desiccant rotor 6 is rotated into the main process section 26, where it once again absorbs moisture from the main process airflow 14.

The temperature of the main desiccant rotor 6 will increase when the main regeneration airflow 28 passes through the main desiccant rotor 6. In order to effectively trap moisture and water from the main process airflow 14 in the main process section 26 of the main desiccant rotor 6, the temperature in the main process section 26 must decrease after leaving the main regeneration section 20. Therefore a purge airflow 30 is led through the purge section 24. The purge airflow 30 may emanate from the main process airflow 14 downstream of the main desiccant rotor 6. Thus, the purge airflow 30 will decrease the temperature of the main desiccant rotor 6. In order to achieve dry main process airflow 14, the purge airflow 30 is directed in the same direction through the main desiccant rotor 6 as the main regeneration airflow 28. As a result, any moisture that is still present in the main desiccant rotor 6 will be pushed out from the main desiccant rotor 6 by means of the purge airflow 30. Thus, the purge airflow 30 will act deep into the main desiccant rotor 6. The pre-processing unit 4 is arranged to heat and/or to dehumidify the main regeneration airflow 28 upstream of the main sorption dehumidifier unit 2.

Figure 2:
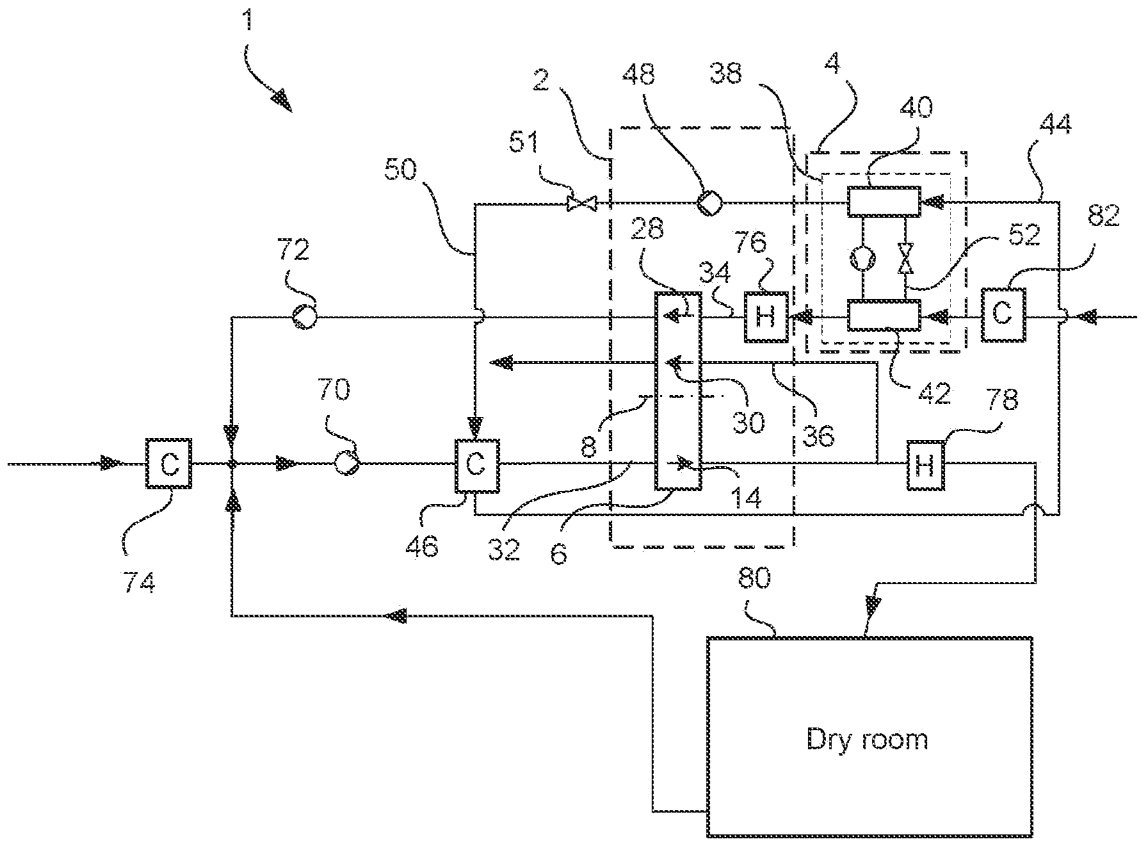
FIGS. 2-6 schematically illustrate gas sorption systems according to different examples.

FIG. 2 schematically illustrate a dehumidification system 1 according to an example. The dehumidification system 1 comprising the main sorption dehumidifier unit 2 and a main process air circuit 32 arranged to conduct the main process airflow 14 through the main desiccant rotor 6 in the main sorption dehumidifier unit 2. A main regeneration air circuit 34 arranged to conduct the main regeneration airflow 28 through the main desiccant rotor 6 in the main sorption dehumidifier unit 2. A purge air circuit 36 is arranged to conduct the purge airflow 30 through the main desiccant rotor 6 in the main sorption dehumidifier unit 2, which purge airflow 30 is configured to flow through the main desiccant rotor 6 in the same direction as the main regeneration airflow 28. The purge air circuit 36 is connected to the main process air circuit 32 downstream of the main sorption dehumidifier unit 2. The purge airflow 30 is configured to be collected from the main process airflow 14 in the main process air circuit 32. The purge airflow 30 downstream of the main desiccant rotor 6 may be released to the surrounding atmosphere. Regeneration air is taken from the ambient space. Process air is taken from the ambient space.

The dehumidification system 1 further comprises the pre-processing unit 4, which is connected to the main regeneration air circuit 34 upstream of the main sorption dehumidifier unit 2. The pre-processing unit 4 is arranged to heat the main regeneration airflow 28 upstream of the main sorption dehumidifier unit 2. The pre-processing unit 4 comprises a heat pump 38, provided with an evaporator 40 and a condenser 42. The main regeneration air circuit 34 is connected to the condenser 42 of the heat pump 38 upstream of the main sorption dehumidifier unit 2.

The dehumidification system 1 further comprises an intermediate fluid circuit 44 with a cooling fluid C, arranged to cool the main process air in a first cooler 46 before inlet of the process air into the main sorption dehumidifier unit 2. The intermediate fluid circuit 44 comprising a fluid pump 48 and a fluid conduit 50 arranged to conduct cooling fluid C through the first cooler 46 and through the evaporator 40 of the heat pump 38. A fluid control valve 51 may be arranged in the fluid conduit 50. The intermediate fluid circuit 44 may be connected to the control device 100. The control device 100 may be configured to control the flow of cooling fluid C in the intermediate fluid circuit 44.

Heat subtracted from the cooling fluid C in the evaporator 40 can be transferred to the main regeneration airflow 28, via a refrigerant circuit 52 of the heat pump 38 and the condenser 42, i.e. heat subtracted from the main process airflow 14 in the first cooler 46 can be utilized for heating the main regeneration air, via the intermediate fluid circuit 44 and the refrigerant circuit 52 of the heat pump 38. A first heater 76 may be comprised in the main regeneration air circuit 34 upstream of the main sorption dehumidifier unit 2, arranged to optionally heat the main regeneration airflow 28 if needed.

When the main regeneration airflow 28 passes through main desiccant rotor 6, the moisture content increases and the temperature decreases of the main regeneration airflow 28. The main regeneration airflow 28 may be released to the surroundings, but at a certain range of rotor 6 rotational speed most heat and moisture will be extracted with the purge 30 flow whereas the regeneration airflow 28 downstream the rotor will be cooler and dryer than the air upstream the cooler 74. It may therefore be advantageous to recover at least some of this air to the main process airflow 14. The first cooler 46 is incorporated into the intermediate fluid circuit 44, and is arranged in the intermediate fluid circuit 44 upstream of the heat pump 38 evaporator 40 so as to cool the main regeneration airflow 28 downstream of the main desiccant rotor 6, thus extracting heat from the main process air circuit 32 upstream the rotor 6. When the temperature of the main process air circuit 32 upstream the rotor 6 decreases during cooling in the first cooler 46, the desiccant in the rotor 6 will attract moisture more efficiently. Thereafter, the main regeneration airflow 28 together with the main process airflow 14 passes the main desiccant rotor 6 and moisture is extracted by the main desiccant rotor 6.

The main process airflow 14 is created by a first fan 70 arranged in the main process air circuit 32 upstream of the main desiccant rotor 6. The main regenerative air is created by a second fan 72 arranged in the main regeneration air circuit 34 downstream of the main desiccant rotor 6. An additional fan may be placed in the purge airflow 30 downstream the rotor 6, to provide a favourable static pressure. A second cooler 74 may be arranged in the main process air circuit 32 upstream of the first fan 70. The main process airflow 14 downstream of the main desiccant rotor 6 may pass a second heater 78 before conveyed to a dry room 80. Exhaust air the dry room 80 is conveyed to the main process air circuit 32 upstream of the main desiccant rotor 6. Further, the main regeneration airflow 28 downstream of the main desiccant rotor 6 is conveyed to the main process air circuit 32 upstream of the main desiccant rotor 6. A third cooler 82 is arranged in the main regeneration air circuit 34 upstream of the condenser 42 of the heat pump 38. Instead of connecting the intermediate fluid circuit 44 to the first cooler 46, it is possible to connect the intermediate fluid circuit 44 to the second cooler 74.

Figure 3:
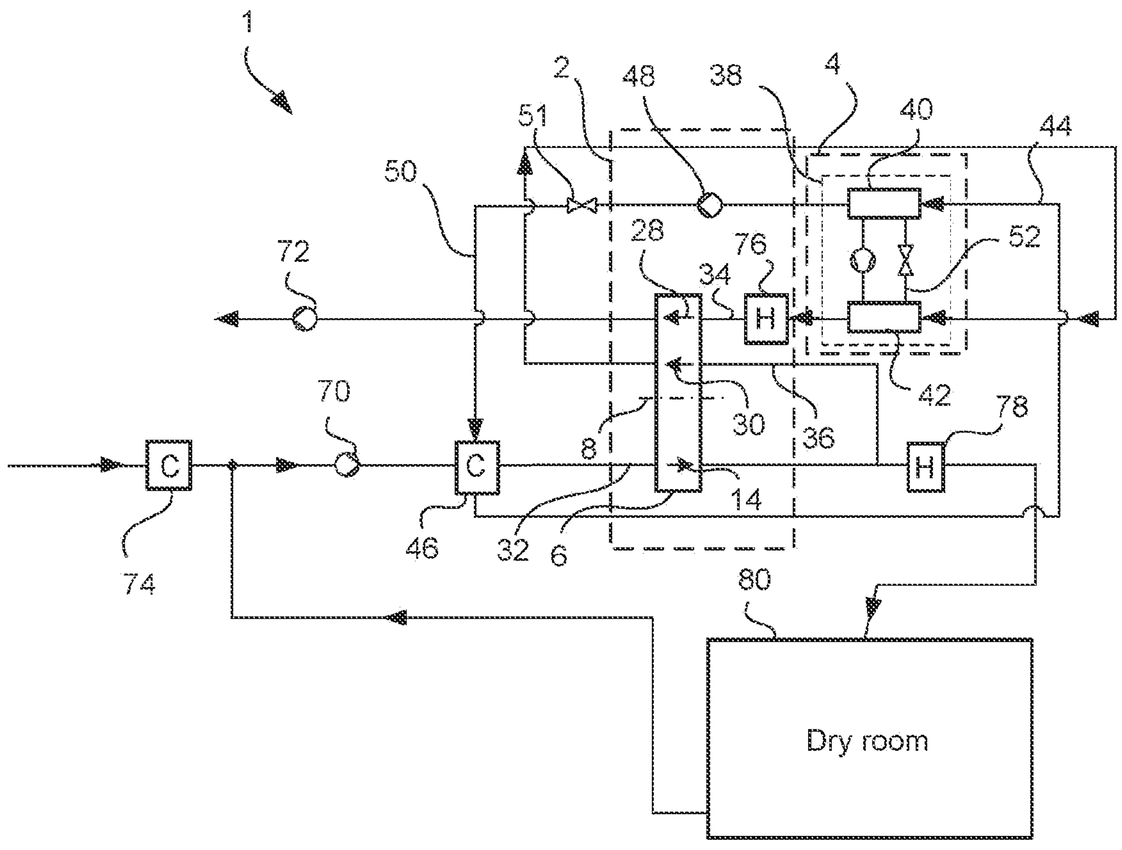

FIG. 3 schematically illustrate a dehumidification system 1 according to an example. The dehumidification system 1 according to this example is similar to the dehumidification system 1 according to the example in FIG. 2. However, according to this example, purge air circuit 36 downstream of the main desiccant rotor 6 is connected to main regeneration air circuit 34 upstream of the condenser 42 of the heat pump 38. Thus, the purge airflow 30 downstream of the main desiccant rotor 6 is convoyed upstream of the main desiccant rotor 6 and purge airstream downstream of the main desiccant rotor 6 is used as the main regeneration airflow 28. The main regeneration airflow 28 downstream of the main desiccant rotor 6 may be released to the surrounding atmosphere. Instead of connecting the intermediate fluid circuit 44 to the first cooler 46, it is possible to connect the intermediate fluid circuit 44 to the second cooler 74.

Figure 4:
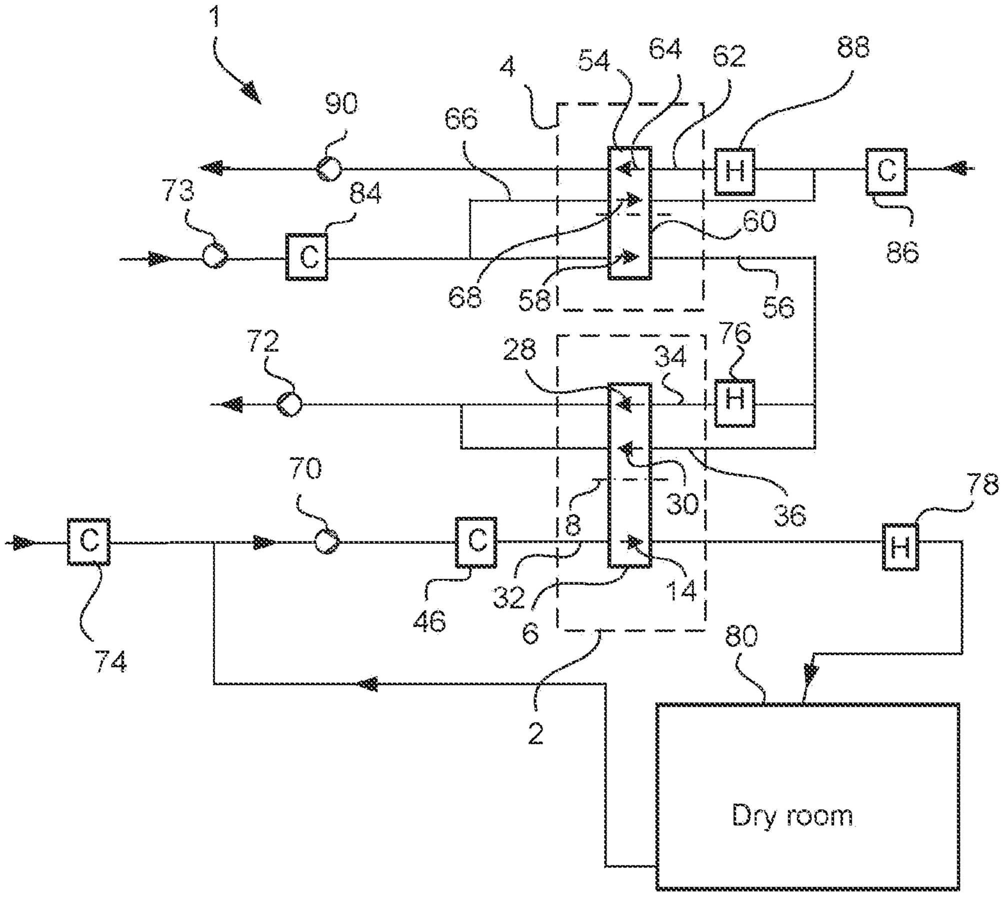

FIG. 4 schematically illustrate a dehumidification system 1 according to an example. The dehumidification system 1 comprising the main sorption dehumidifier unit 2 and a main process air circuit 32 arranged to conduct the main process airflow 14 through the main desiccant rotor 6 in the main sorption dehumidifier unit 2. A main regeneration air circuit 34 is arranged to conduct the main regeneration airflow 28 through the main desiccant rotor 6 in the main sorption dehumidifier unit 2. A purge air circuit 36 is arranged to conduct the purge airflow 30 through the main desiccant rotor 6 in the main sorption dehumidifier unit 2, which purge airflow 30 is configured to flow through the main desiccant rotor 6 in the same direction as the main regeneration airflow 28. The purge air circuit 36 is connected to the main regeneration air circuit 34 downstream of the main sorption dehumidifier unit 2. The main regeneration airflow 28 and the purge airflow 30 downstream of the main desiccant rotor 6 may be released to the surrounding atmosphere.

The dehumidification system 1 further comprises the pre-processing unit 4, which is connected to the main regeneration air circuit 34 and the purge air circuit 36 upstream of the main sorption dehumidifier unit 2. The pre-processing unit 4 is arranged to dehumidify the main regeneration airflow 28 and the purge airflow 30 upstream of the main sorption dehumidifier unit 2. The pre-processing unit 4 comprises a pre-sorption unit 54, which may be a pre-sorption dehumidifier unit 54. A pre-process air circuit 56 is arranged to conduct a pre-process airflow 58 through a pre-sorption rotor 60, which may be a pre-desiccant rotor 60 in the pre-sorption dehumidifier unit 54. A pre-regeneration air circuit 62 arranged to conduct a pre-regeneration airflow 64 through the pre-desiccant rotor 60 in the pre-sorption dehumidifier unit 54. The pre-process air circuit 56 is connected to the main regeneration air circuit 34 upstream of the main desiccant rotor 6 for conducting the pre-process airflow 58 to the main regeneration air circuit 34. In addition, the pre-process air circuit 56 is connected to the purge air circuit 36 upstream of the main desiccant rotor 6 for conducting the pre-process airflow 58 to the purge air circuit 36. Pre-regeneration air is taken from the ambient space. Pre-process air is taken from the ambient space.

A pre-purge air circuit 66 is connected to the pre-process air circuit 56 upstream of the pre-desiccant rotor 60. Pre-purge air is collected from the pre-process airflow 58 in the pre-process air circuit 56. In the pre-processing unit 4 the pre-purge airflow 68 is directed in the opposite direction comparing to the pre-regeneration airflow 64 through the pre-desiccant rotor 60.

A third fan 73 and a fourth cooler 84 is arranged in the pre-process air circuit 56 upstream of the pre-desiccant rotor 60. A fifth cooler 86 is arranged in the pre-regeneration air circuit 62 upstream of the pre-desiccant rotor 60. A third heater 88 is arranged in the pre-regeneration air circuit 62 upstream of the pre-desiccant rotor 60. A fourth fan 90 is arranged in the pre-regeneration air circuit 62 downstream of the pre-desiccant rotor 60.

Figure 5:
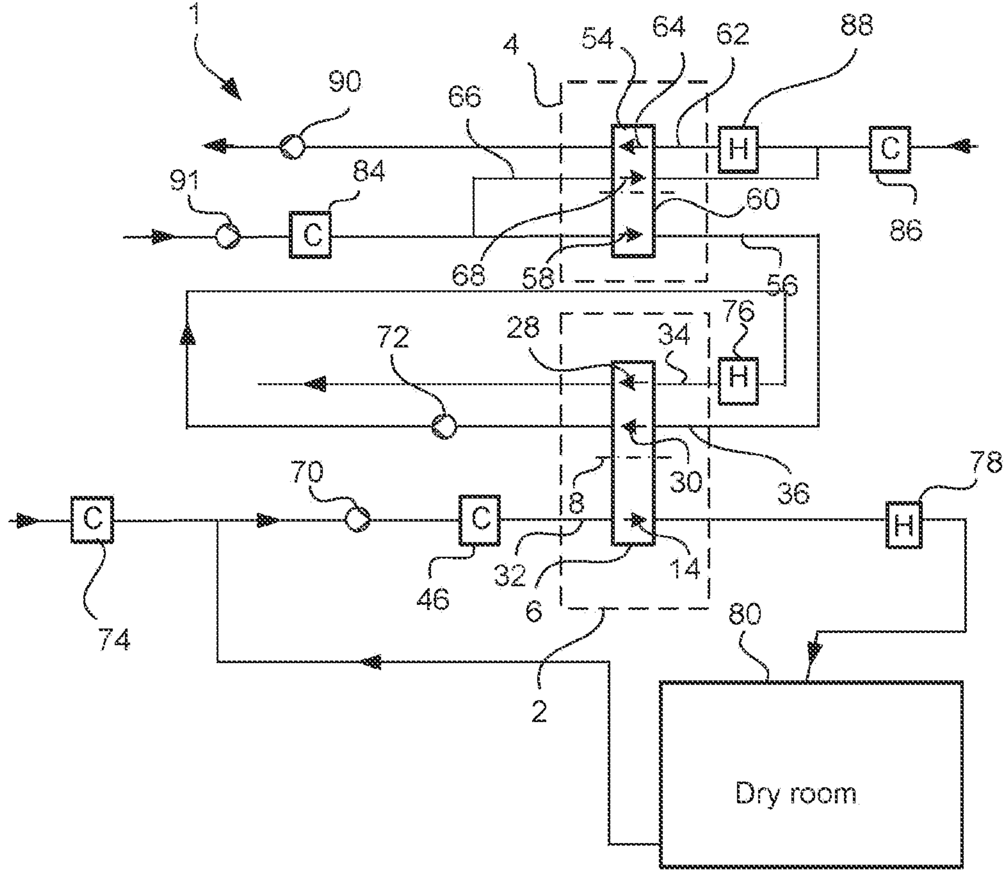

FIG. 5 schematically illustrate a dehumidification system 1 according to an example. The dehumidification system 1 according to this example is similar to the dehumidification system 1 according to the example in FIG. 4. However, according to this example, the pre-desiccant rotor 60 is arranged to conduct the pre-process airflow 58 to the main regeneration air circuit 34 via the purge air circuit 36. The purge air circuit 36 downstream of the main desiccant rotor 6 is connected to the main regeneration air circuit 34 upstream of the main desiccant rotor 6.

Further, the purge air circuit 36 upstream of the main desiccant rotor 6 may be connected to the pre-process air circuit 56 downstream of the pre-desiccant rotor 60. A fifth fan 91 is arranged in the pre-process air circuit 56 upstream of the pre-desiccant rotor 60.

Figure 6:
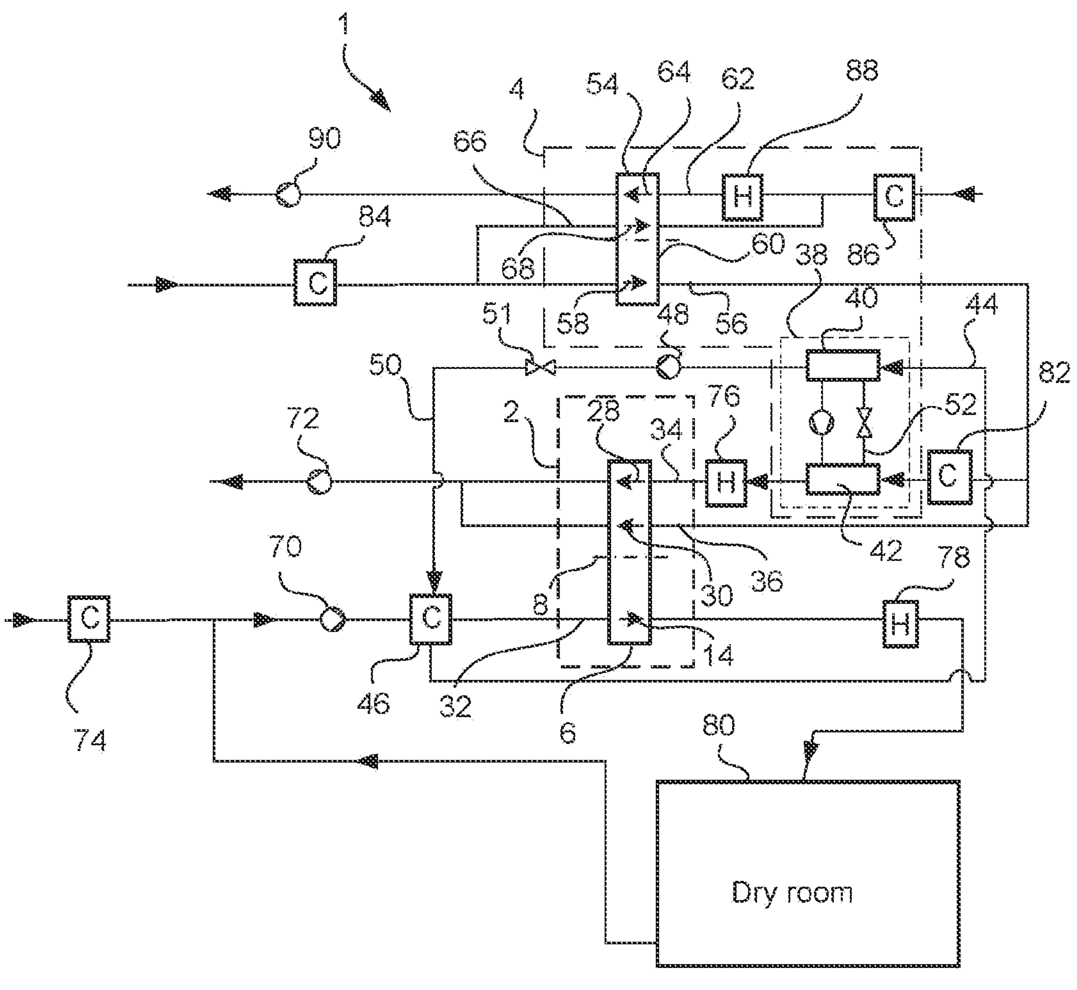

FIG. 6 schematically illustrate a dehumidification system 1 according to an example. The dehumidification system 1 according to this example is similar to the dehumidification system 1 according to the example in FIG. 4. However, according to this example, the heat pump 38 according to the examples in FIGS. 2 and 3 is arranged in the pre-processing unit 4 together with the pre-sorption dehumidifier unit 54. The main regeneration air circuit 34 is connected to the condenser 42 of the heat pump 38 upstream of the main sorption dehumidifier unit 2. The heat pump 38 and the components connected to the heat pump 38 are referred to in the examples shown in FIGS. 2 and 3. Analogously a heat pump 38 could be added to the design in FIG. 5, by integrating the heat pump like in FIG. 3, i.e. the heat pump will transfer heat from upstream the main process circuit to downstream the main purge circuit. Instead of connecting the intermediate fluid circuit 44 to the first cooler 46, it is possible to connect the intermediate fluid circuit 44 to the second cooler 74.

Figure 7:
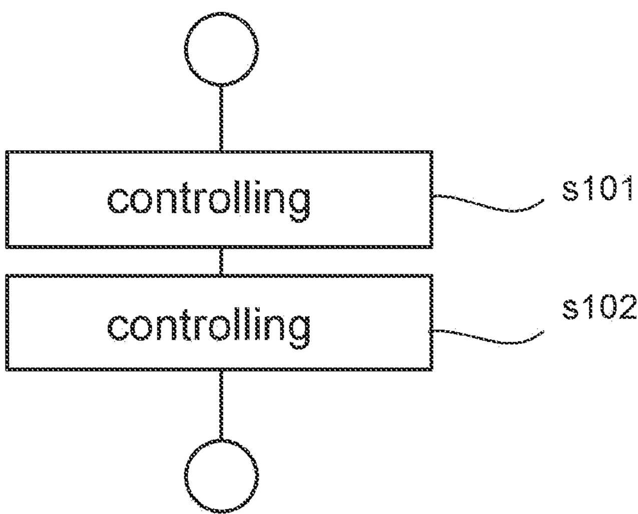
FIG. 7 shows a flowchart of a method according to an example.

FIG. 7 shows a flowchart of a method according to an example. The method is performed by a control device 100, for controlling a dehumidification system 1. The method relates to the dehumidification system 1 disclosed in FIGS. 1-7. The air dehumidification system 1 thus comprises a main sorption dehumidifier unit 2; a main process air circuit 32 arranged to conduct a main process airflow 14 through a main desiccant rotor 6 in the main sorption dehumidifier unit 2; a main regeneration air circuit 34 arranged to conduct a main regeneration airflow 28 through the main desiccant rotor 6 in the main sorption dehumidifier unit 2; a purge air circuit 36 arranged to conduct a purge airflow 30 through the main desiccant rotor 6 in the main sorption dehumidifier unit 2, which purge airflow 30 is configured to flow through the main desiccant rotor 6 in the same direction as the main regeneration airflow 28 and the control device, wherein the dehumidification system 1 further comprises a pre-processing unit 4 connected to the main regeneration air circuit 34 upstream of the main sorption dehumidifier unit 2, wherein the pre-processing unit 4 is arranged to heat and/or to dehumidify the main regeneration airflow 28 upstream of the main sorption dehumidifier unit 2, wherein the method comprising the steps of: controlling s101 the main sorption dehumidifier unit 2 depending on the characteristics of the main process air in the main process airflow 14 downstream of the main sorption dehumidifier unit 2; and controlling s102 the pre-processing unit 4 depending on the characteristics of the main regeneration air in the main regeneration airflow 28 upstream of the main sorption dehumidifier unit 2.

Figure 8:
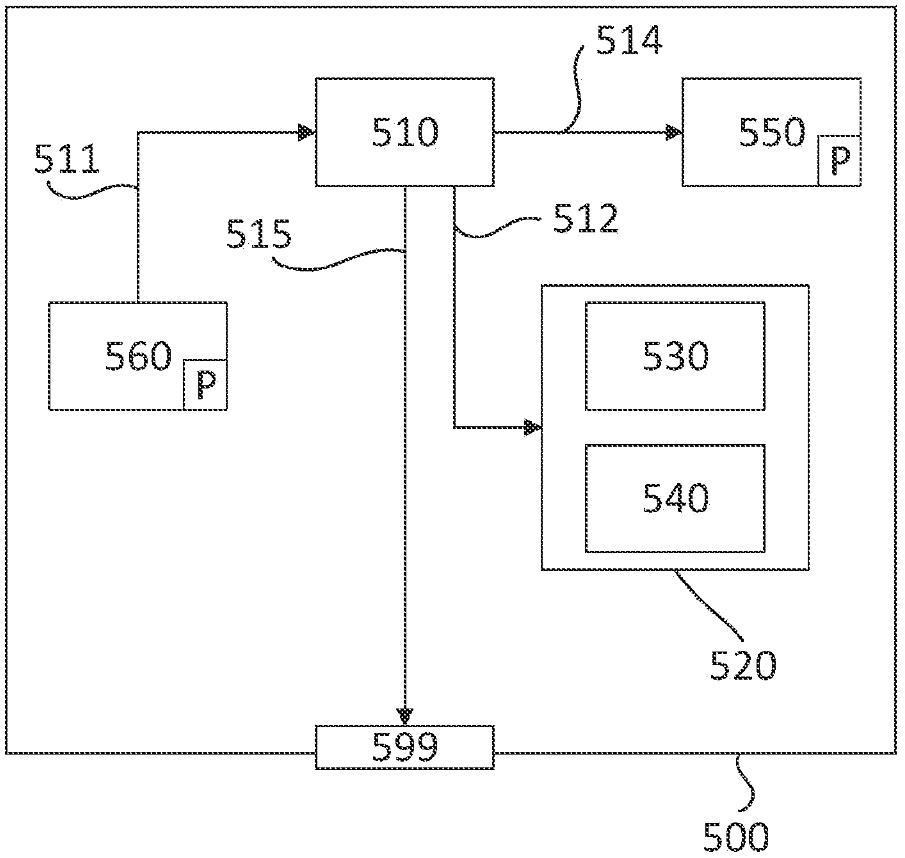
FIG. 8 schematically illustrates a device or computer according to an example.

FIG. 8 schematically illustrates a device 500 or computer according to an example. The control device 100 described with reference to FIGS. 2-6 may in a version comprise the device 500. The device 500 comprises a non-volatile memory 520, a data processing unit 510 and a read/write memory 550. The non-volatile memory 520 has a first memory element 530 in which a computer programme, e.g. an operating system, is stored for controlling the function of the device 500. The device 500 further comprises a bus controller, a serial communication port, I/O means, an A/D converter, a time and date input and transfer unit, an event counter and an interruption controller (not depicted). The non-volatile memory 520 has also a second memory element 540.

There is provided a computer programme P which comprises instructions for carry out the above-mentioned method. The programme P may be stored in an executable form or in a compressed form in a memory 560 and/or in a read/write memory 550. Where the data processing unit 510 is described as performing a certain function, it means that the data processing unit 510 effects a certain part of the programme stored in the memory 560 or a certain part of the programme stored in the read/write memory 550. The data processing device 510 can communicate with a data port 599 via a data bus 515. The non-volatile memory 520 is intended for communication with the data processing unit 510 via a data bus 512. The separate memory 560 is intended to communicate with the data processing unit 510 via a data bus 511. The read/write memory 550 is adapted to communicating with the data processing unit 510 via a data bus 514.

When data are received on the data port 599, they are stored temporarily in the second memory element 540. When input data received have been temporarily stored, the data processing unit 510 is prepared to effect code execution as described above. Parts of the methods herein described may be effected by the device 500 by means of the data processing unit 510 which runs the programme stored in the memory 560 or the read/write memory 550. When the device 500 runs the programme, methods herein described are executed.

The foregoing description of the embodiments has been furnished for illustrative and descriptive purposes. It is not intended to be exhaustive, or to limit the embodiments to the variations described. Many modifications and variations will obviously be apparent to one skilled in the art. The embodiments have been chosen and described in order to best explicate principles and practical applications, and to thereby enable one skilled in the arts to understand the invention in terms of its various embodiments and with the various modifications that are applicable to its intended use. The components and features specified above may, within the frame work of the disclosure, be combined between different embodiments specified.

The invention claimed is:

1. A gas sorption system comprising a main sorption unit;

a main process air circuit arranged to conduct a main process airflow through a main sorption rotor in the main sorption unit;

a main regeneration air circuit arranged to conduct a main regeneration airflow through the main sorption rotor in the main sorption unit;

a purge air circuit arranged to conduct a purge airflow through the main sorption rotor in the main sorption unit, the purge airflow being configured to flow through the main sorption rotor in the same direction as the main regeneration airflow;

a pre-processing unit comprising a heat pump, which comprises an evaporator and a condenser, wherein the pre-processing unit is connected to the main regeneration air circuit upstream of the main sorption unit, the pre-processing unit being arranged to heat and/or to dehumidify the main regeneration airflow upstream of the main sorption unit; and an intermediate fluid circuit with a cooling fluid arranged to cool the main process air in a first cooler before inlet of the process air into the main sorption unit, the intermediate fluid circuit comprising a fluid pump and a fluid conduit arranged to conduct cooling fluid through the first cooler and through the evaporator of the heat pump, wherein the purge air circuit and the main regeneration air circuit are connected to the main process air circuit downstream of the main sorption unit, and the purge airflow and the main regeneration airflow are configured to be collected from the main process airflow in the main process air circuit, so that the purge airflow downstream of a main desiccant rotor is used as the main regeneration airflow, wherein the main regeneration circuit is connected to the condenser of the heat pump upstream of the main sorption unit.

2. The system of claim 1, wherein the purge air circuit downstream of the main sorption unit is connected to the condenser of the heat pump, and wherein the main regeneration airflow is collected from the purge airflow in the purge air circuit.

3. The system according to claim 1, wherein the condenser of the heat pump is connected to the pre-process air circuit downstream of the pre-sorption rotor and to the main regeneration air circuit upstream of the main sorption rotor.

4. The system according to claim 3, further comprising an intermediate fluid circuit with a cooling fluid, arranged to cool the process air in a first cooler before inlet of the process air into the main sorption unit, the intermediate fluid circuit comprising a fluid pump and a fluid conduit arranged to conduct cooling fluid through the first cooler and through the evaporator of the heat pump.

5. A method, performed by a control device, for controlling the gas sorption system according to claim 1, the method comprising the steps of:

controlling the main sorption unit depending on characteristics of the main process air in the main process airflow downstream of the main sorption unit; and controlling the pre-processing unit depending on characteristics of the main regeneration air in the main regeneration airflow upstream of the main sorption unit.

6. A computer program stored on a non-transitory computer-readable medium and comprising instructions which, when the program is executed by a computer, cause the computer to carry out the method according to claim 5.

7. A non-transitory computer-readable medium comprising instructions, which when executed by a computer, cause the computer to carry out the method according to claim 5.

8. A gas sorption system comprising a main sorption unit;

a main process air circuit arranged to conduct a main process airflow through a main sorption rotor in the main sorption unit;

a main regeneration air circuit arranged to conduct a main regeneration airflow through the main sorption rotor in the main sorption unit;

a purge air circuit arranged to conduct a purge airflow through the main sorption rotor in the main sorption unit, the purge airflow being configured to flow through the main sorption rotor in the same direction as the main regeneration airflow; and a pre-processing unit connected to the main regeneration air circuit upstream of the main sorption unit, the pre-processing unit being arranged to heat and/or to dehumidify the main regeneration airflow upstream of the main sorption unit, wherein the pre-processing unit comprises a pre-sorption unit; a pre-process air circuit arranged to conduct a pre-process airflow through a pre-sorption rotor in the pre-sorption unit; and a pre-regeneration air circuit arranged to conduct a regeneration airflow through the pre-sorption rotor in the pre-sorption unit, wherein the pre-process air circuit is connected to the main regeneration air circuit upstream of the main sorption rotor for conducting the pre-process airflow to the main regeneration air circuit, wherein the pre-process air circuit is connected to the purge air circuit upstream of the main sorption rotor for conducting the pre-process airflow to the purge air circuit, and wherein the pre-sorption rotor is arranged to conduct the pre-process airflow to the main regeneration air circuit via the purge air circuit.

9. The system of claim 8, wherein the pre-processing unit comprises a heat pump, comprising an evaporator and a condenser, and wherein the main regeneration air circuit is connected to the condenser of the heat pump upstream of the main sorption unit.

10. The system according to claim 9, further comprising an intermediate fluid circuit with a cooling fluid arranged to cool the main process air in a first cooler before inlet of the process air into the main sorption unit, the intermediate fluid circuit comprising a fluid pump and a fluid conduit arranged to conduct cooling fluid through the first cooler and through the evaporator of the heat pump.

11. A method, performed by a control device, for controlling the gas sorption system according to claim 8, the method comprising the steps of:

controlling the main sorption unit depending on characteristics of the main process air in the main process airflow downstream of the main sorption unit; and controlling the pre-processing unit depending on characteristics of the main regeneration air in the main regeneration airflow upstream of the main sorption unit.

* * * * *